United States Patent [19]

Neuner et al.

[11] 3,902,060

[45] Aug. 26, 1975

[54] SELF-OPTIMIZING BIASING FEEDBACK FOR PHOTO-ELECTRIC TRANSMISSION SYSTEMS

[75] Inventors: James A. Neuner; Maurizio Traversi, both of Pittsburgh, Pa.; Dean C. Santis, Fairborn, Ohio

[73] Assignee: Westinghouse Electric Corporation, Pittsburgh, Pa.

[22] Filed: Apr. 4, 1972

[21] Appl. No.: 241,048

[52] U.S. Cl. .................. 250/199; 250/206

[51] Int. Cl. .................. H04b 9/00

[58] Field of Search ......... 250/199, 206; 330/4, 4.3; 329/144

[56] References Cited

UNITED STATES PATENTS

| | | | |
|---|---|---|---|
| 3,223,938 | 12/1965 | Brook | 250/199 |
| 3,397,317 | 8/1968 | Dosch | 250/206 |
| 3,486,029 | 12/1969 | Barrett et al. | 250/199 |
| 3,573,466 | 4/1971 | Von Feldt | 250/206 |

*Primary Examiner*—Albert J. Mayer
*Attorney, Agent, or Firm*—D. C. Abeles

[57] ABSTRACT

A photo-electric transmission system having a non-linear negative feedback unit to optimize a light sensor's output and thereby reduce the response time, power consumption and noise generation of the system.

7 Claims, 15 Drawing Figures

SELF-OPTIMIZING BIASING FEEDBACK FOR PHOTO-ELECTRIC TRANSMISSION SYSTEMS

BACKGROUND OF THE INVENTION

This invention pertains in general to electrical transmission systems and more particularly to electrically isolated, light responsive, photo-electric transmission systems.

Data transmission between two electrically isolated portions of various systems is often required. One such system has previously been described in application Ser. No. 240,938, (W.E. Case 43,135), entitled "Communication Between Redundant Protection and Safeguard Logic Systems Within Nuclear Reactor Power Plants by Means of Light", filed Apr. 4, 1972. Photo-coupled isolation devices recently introduced in the art offer many advantages with respect to other devices previously employed. However, due to the wide spread of their operating characteristics and the lack of "end of life" specifications, these devices present considerable problems in the design of simple and efficient circuits capable of reliable operation with near to optimum performance over extended periods. Various other devices, other than photo-coupled devices, can and have been employed in such communication systems. Each of these devices has characteristics that can easily be surpassed by most photo-coupled devices, however, the unpredictable long range operating characteristics of photo-coupled devices have precluded their use in many applications.

Relays, which have been employed in transmission systems in the past provide the required isolation by virtue of their coil-to-contact and contact-to-contact separation. However, relays display many of the deficiencies normally associated with electromechanical systems, such as slow response time, large physical size, sensitivity to vibration, limited life, and contact film breakdown and bounce.

Transformers, which have also been employed for this purpose, provide electrical isolation through the separation of the primary and secondary windings. However, transformers exhibit many undesirable characteristics, such as the inability to pass a DC signal and at times, insufficient AC isolation. Although transformers provide excellent DC isolation they are capable of passing transients in either direction.

Additionally, capacitive couplings have been employed for this purpose, exhibiting disadvantages similar to those set forth for transformers with an even higher susceptibility to shorting.

Photo-coupled isolation devices such as the device described in application Ser. No. 240,938, (W.E. Case 43,135) previously cited, exhibit a number of characteristics which are specifically suitable to data transmission systems which require electrical isolation at various points. For example, the maximum DC and AC voltage isolation that can be provided by photo-coupled systems far exceeds that of relays, transformers and capacitive coupled systems. Additionally, photo-coupled devices are inherently unidirectional, as relays. Furthermore, reliability and operating life characteristics can be improved by utilizing solid-state lamps such as light-emitting diodes and photodetectors such as photo-diodes and photo-transistors. However, despite these advantages, data transmission systems employing photo-coupled devices have to pay a trade-off of relatively slow response times and/or unnecessary power consumption. Thus, a new, simple circuit scheme is desired which can overcome the design drawbacks previously stated and result in an optimum combination of efficiency, speed, reliability and cost over a wide temperature range.

SUMMARY OF THE INVENTION

Briefly, this invention provides an inexpensive, simplified circuitry scheme to overcome the design drawbacks previously experienced in photo-coupled data transmission systems. The improvement provided, employs a non-linear negative feedback unit to optimize a light sensor's output to an optimum value to improve the many important characteristics of photo-coupled data transmission systems including response time, power consumption, noise generation and reliability, in a simple, inexpensive manner.

Thus, in accordance with this invention, an electrically isolated photo-electric transmission system is provided employing a photo-electric light emitting element physically separated and electrically isolated from a light responsive sensor. The light responsive sensor provides an electrical output upon the reception of light from the light emitting element. The sensor output is in turn communicated to means for indicating an increase in the output of the sensor. A non-linear negative feedback loop is electrically coupled between the indication means and the sensor to control the output of the sensor within desired optimum limits. Additionally, modifications are provided to optimize the circuits response time and physical size.

Thus, a self-adaptive photo-electric circuit is achieved that overcomes the many design drawbacks previously experienced which prohibited employing such circuits in many communication systems.

BRIEF DESCRIPTION OF THE DRAWINGS

For a better understanding of the invention, reference may be had to the preferred embodiment, exemplary of the invention, shown in the accompanying drawings, in which:

FIG. 3 is a schematic circuitry diagram of a second prior art modification to the circuit of FIG. 1a;

DESCRIPTION OF PREFERRED EMBODIMENT

Excluding the novel circuitry scheme contemplated by this invention, no satisfactory circuitry scheme is presently available which permits a designer to take advantage of the outstanding characteristics of photo-coupled isolation devices in providing a simple and inexpensive circuit for fast and reliable data transmission between systems that must be kept isolated. This is particularly true when highly reliable hardware is desired which guarantees a long operating life over a large number of communication channels. Such conditions require a drastic derating of the many vital parameters guaranteed by manufacturers at the beginning of operating life, which results in an almost prohibitive worst case design in which best to worst case values differ by several orders of magnitude. In such cases a self-adaptive circuit is desired to balance performance at opposite extremes.

Figure 1A:
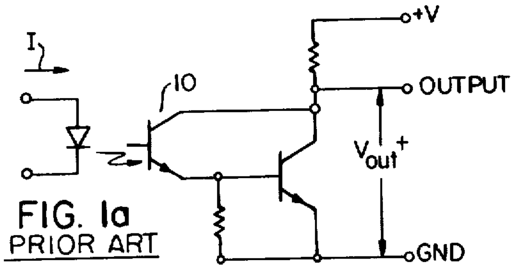
FIG. 1a PRIOR ART
FIG. 1*a* is a schematic circuitry diagram of a prior art embodiment of a photo-electric data transmission system.
Figure 1B:
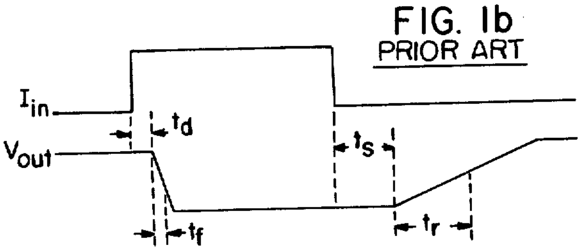
FIG. 1b PRIOR ART
FIG. 1*b* is a graphical illustration of the input-output characteristics of the circuit of FIG. 1*a*.
Figure 2:
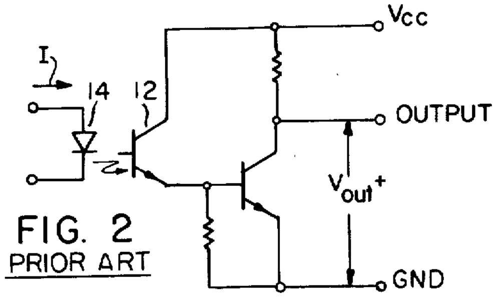
FIG. 2 PRIOR ART
FIG. 2 is a schematic circuitry diagram of a prior art modification to the circuit of FIG. 1*a*.

In the past data transmission systems employing photo-coupled devices had to pay a trade-off of relatively slow response times and/or unnecessary power consumption as demonstrated by the typical circuits illustrated in FIGS. 1*a* and 2. In the circuit of FIG. 1*a*, the phototransistor 10 is operated in a saturated mode. Since most photo-transistors are usually slow, this circuit exhibits very long storage and rise times as exemplified in the graphic illustration presented in FIG. 1*b*. The storage time is designated by $t_s$ while the fall and rise times are respectively designated on the falling edge and rising edge as $t_f$ and $t_r$. Additionally, the slow response of the circuit is typified by the delay time $t_d$. Thus, the long storage and rise times are exhibited as a very undesirable noise pulse stretching characteristic.

In the circuit of FIG. 2, the photo-transistor 12 is operated in the active region. The transfer ratio of input current to output current varies greatly from unit to unit depending upon alignment of the light emitting diode 14 to the photo-transistor 12, efficiency of the light source, light pipe and light detector, gain of the photo-transistor, etc. To assure that all units will operate properly, the circuit must be designed to accommodate units with the lowest current transfer ratio. Inasmuch as units with the best transfer ratio will conduct considerably more current than required, unnecessary power consumption, noise generation and storage delay effects are experienced.

Figure 3:
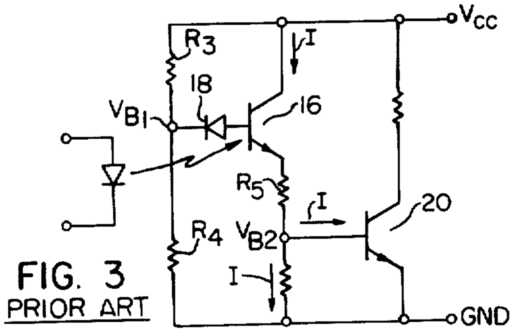
FIG. 3 PRIOR ART

Several modifications of the simple circuitry schemes illustrated in FIGS. 1*a* and 2 have been proposed to overcome these drawbacks. One such scheme illustrated in FIG. 3, limits the collector current of photo-transistor 16 by employing it as a current source. The diode 18 clamps the base voltage of transistor 16 to $V_{B1}$, established by the resistor network $R_3$ and $R_4$ so that the collector current is limited by resistor $R_5$ to approximately $$I_c = \frac{(V_{B1} - V_{B2})}{R_5}$$

This circuit, however, does not solve the problem associated with the voltage change across the collector base junction of transistor 16 and the turn-off time remains relatively long while turn-on is very fast since diode 18 begins its limiting action only when transistor 20 is well into saturation.

Figure 4A:
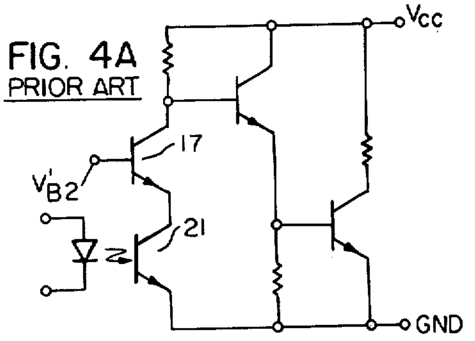
FIG. 4A PRIOR ART
FIG. 4*a* is a schematic circuitry diagram of a modification to the circuit of FIG. 3.
Figure 4B:
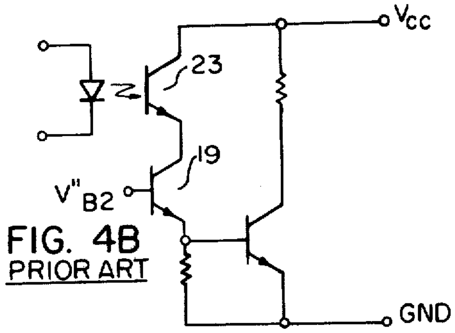
FIG. 4B PRIOR ART
FIG. 4*b* is a schematic circuitry diagram of a second modification to the circuitry of FIG. 3.

To solve the turn-off delay time problem and the associated pulse stretching behavior, two similar schemes illustrated in FIGS. 4*a* and 4*b* have been proposed which utilize a common base transistor (base tied to a fixed voltage and signal applied to emitter) in a cascade configuration to keep the voltages across the various junction capacitances of the photo-transistor as constant as possible. This is accomplished by providing a low impedance source formed by transistors 17 and 91 to the collector of transistor 21 and the emitter of transistor 23, respectively. It is evident, however, that the improvement with respect to the simpler circuit of FIG. 2 is only apparent — the collector-to-base voltage always changes by $2V_{BE}$ (base to emitter voltage) from light-on to light-off. The collector current of the photo-transistor is always limited by the gain only and the same decrease in the power dissipation of the photo-transistor could have been obtained by connecting the collector of the photo-transistor of FIG. 2 to a smaller voltage equal to either $V'_{B2}$ or $V_{CC} - V''_{B2}$ without the use of the additional components.

Figure 5:
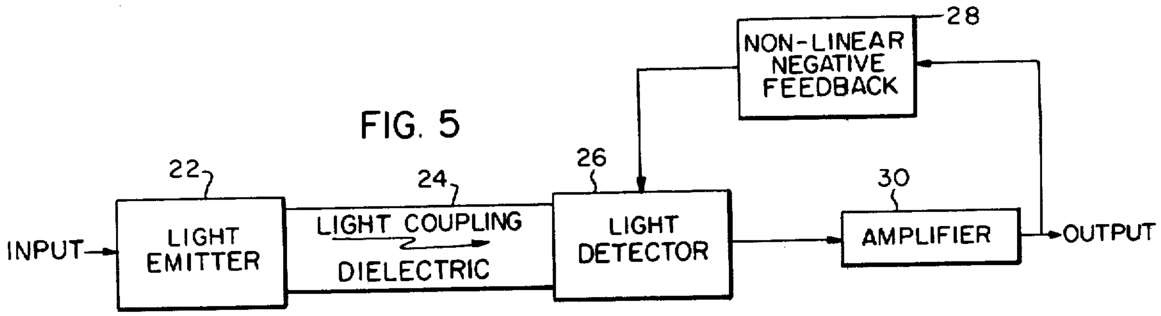
FIG. 5 is a block diagram of the photo-electric transmission system of this invention.

Accordingly, to obviate the disadvantages of the aforedescribed circuits, this invention employs a non-linear, negative feedback circuit to regulate the light sensor's output current to an optimum value. FIG. 5 shows a block diagram of such a scheme. A photo-electric light emitter 22 provides a light output when excited by an electrical input. The light output is communicated through a clear dielectric 24 to a light detector 26 such as the phototransistor previously described. The light detector output in response to a light emission from the emitter 22 is detected by amplifier 30 whose output is diverted through a non-linear negative feedback unit 28 to the light detector 26 to control the output thereof within acceptable limits. The actual implementation of the block diagram, which utilizes a clamping diode to limit the collector current is an impressive improvement over the circuitry scheme illustrated in FIG. 3.

Figure 6A:
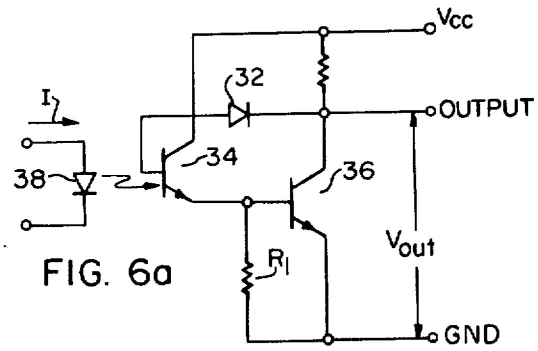
FIG. 6*a* is a schematic circuitry diagram of one preferred embodiment of this invention.

An exemplary preferred embodiment of the block diagram of FIG. 5 is illustrated in FIG. 6*a*. If the clamping diode 32 is connected as shown in FIG. 6*a* to the collector of the output transistor amplifier 36, a double advantage is obtained. Instead of limiting the collector current of the photo-transistor 34 to a fixed maximum value, diode 32 now regulates the same collector current to the value required to bring the collector of transistor 36 one diode drop below the base of transistor 34. In this process all the circuit parameters are taken into account — transistor gain spread, resistor tolerances, etc. The power dissipation is always limited to the minimum amount required to keep transistor 36 at the threshold of saturation and at the same time, since both transistors 34 and 36 are in the active region, optimum speed conditions are maintained. Furthermore, the voltage change across the collector-base junction is minimized so that its capacitance will not affect the response time. The turn-off time depends on the capacitance of the regulating diode 32 so that for good performance a low-capacitance ultra-fast computer diode is desired as well as careful circuit layout to minimize stray capacitances.

Figure 6B:
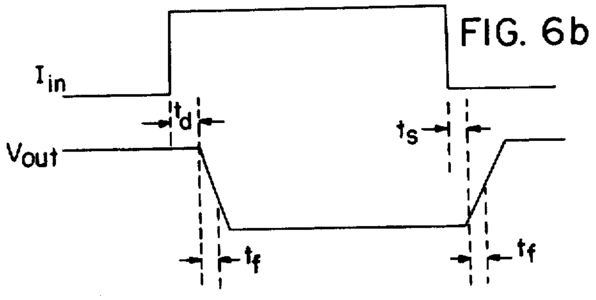
FIG. 6*b* is a graphical illustration of the input-output characteristics of the circuit of FIG. 6*a*.
Figure 7A:
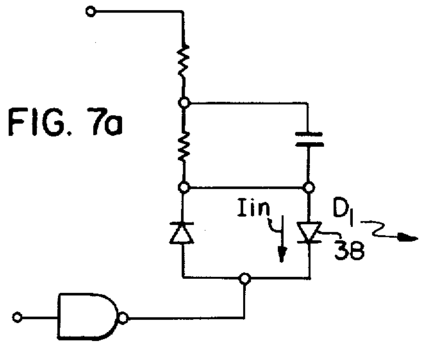
FIG. 7*a* is a schematic circuitry diagram of an optimized input circuit for the circuit of FIG. 6*a*.
Figure 7B:
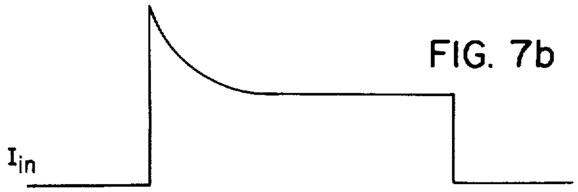
FIG. 7*b* is a graphical illustration of the resultant current waveform provided by the circuit of FIG. 7*a*.

Turn-on delay time results primarily because the inherent base-emitter capacitance of transistor 34 and the parasitic capacitance of diode 32 must be charged up by the increased collector-base leakage of transistor 34. Consequently, the turn-on delay time and fall time may each be reduced by supplying a current waveform to the light emitting diode 38 that is initially high and quickly decays to a permissible DC level instead of the square pulse shown in FIG. 6*b*. A simple circuit capable of supplying such an input current signal to the light emitting diode 38 is illustrated in FIG. 7*a*. The resultant current waveform, $I_{IN}$, to the light emitting diode 38 is illustrated in FIG. 7*b*.

The operation of the basic circuit of FIG. 6*a* to implement the novel feedback scheme contemplated by this invention is described as follows: As the current $I_{IN}$ is supplied to the light emitting diode 38, it emits photons that travel through a clear dielectric and fall upon the collector base junction of the photo-transistor 34, causing a proportional increase in junction leakage. This leakage, increased by the gain of transistor 34, flows into resistor R1 and the base of transistor 36, turning transistor 36 "on" (into the active region) and causing $V_{OUT}$ to decrease. When $V_{OUT}$ equals approximately one diode drop above ground, the non-linear negative feedback supplied by diode 32 diverts excess leakage current from the base of transistor 34. Consequently, transistors 34 and 36 remain in the active region at the threshold of saturation and the current from the light sensor 34 is kept at the optimum level required to maintain this condition. Since the collector current of transistor 34 is now independent of the transfer ratio, power consumption and noise generation are greatly reduced. To return to the original state, current $I_{IN}$ is returned to zero, diode 38 stops emitting light, causing the leakage of the collector base junction of transistor 34 to return to its original dark value. Consequently, the collector current of transistor 36 decreases and $V_{OUT}$ increases, approaching $+V_{CC}$. Since both transistors 34 and 36 remain in the active region when diode 38 emits light, storage delay effects are minimized. The rise time is no longer a function of the variable current transfer ratio of the photo-coupled device or a function of the large collector base capacitance of the phototransistor 34.

Figure 8:
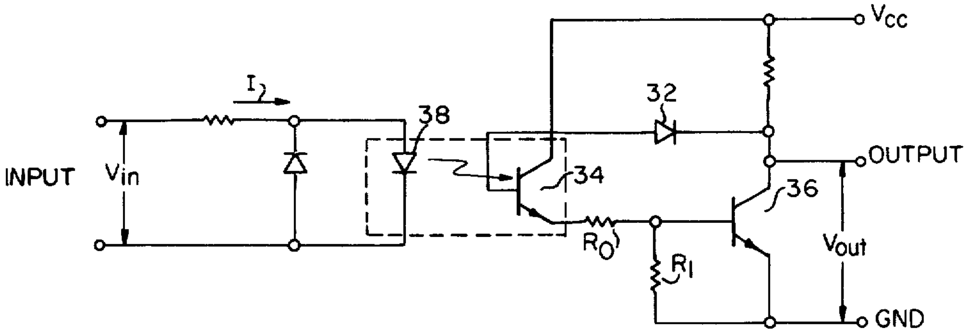
FIG. 8 is a schematic circuitry diagram of a modification to the circuit of FIG. 6*a*.
Figure 9:
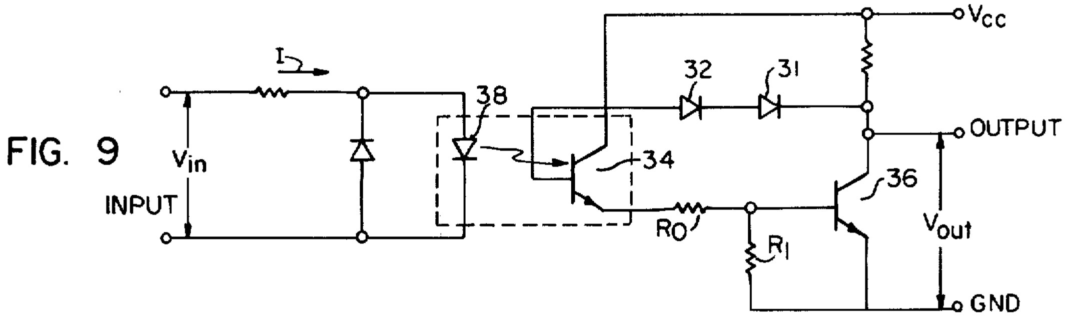
FIG. 9 is a schematic circuitry diagram of a second modification to the circuit of FIG. 6*a*.
Figure 11:
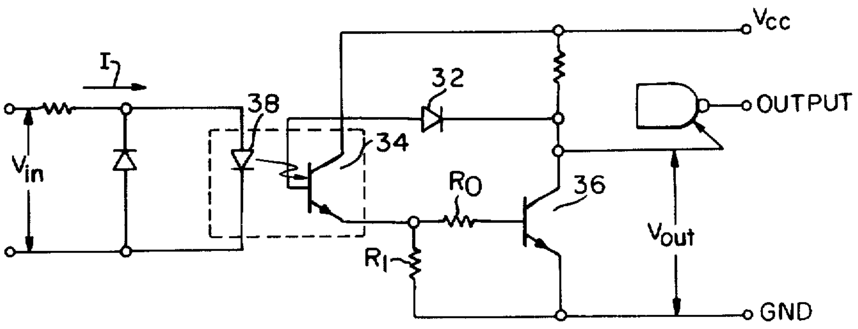
FIG. 11 is a schematic circuitry diagram of a modification to the circuit of FIG. 6*a* to interface with diode-transistor-logic and transistor-transistor-logic gates.

Two alternate modifications of the basic circuit of FIG. 6*a* are illustrated in FIGS. 8 and 9. Under certain conditions, when complete high frequency models are considered for the regulating diode and the phototransistor, the negative feedback provided by the diode may turn out to be a positive feedback at high frequency, due to a 180° phase shift. To stabilize the regulating loop at high frequencies, an additional resistor is employed between the emitter of the photo-transistor and the base of the amplifying transistor ($R_0$ in FIGS. 8, 9 and 11).

Furthermore, for high temperature application the leakage current of the ultra-fast low capacitance diode 32 could increase enough to turn-on photo-transistor 34 even when no light is emitted by diode 38. This undesirable situation can be avoided by adding a low leakage diode 31 in series with diode 32 as illustrated in FIG. 9. The actual leakage current is then limited by diode 32 while the overall capacitance across diodes 31 and 32, in series, remains very close to that of diode 32 alone.

Figure 10:
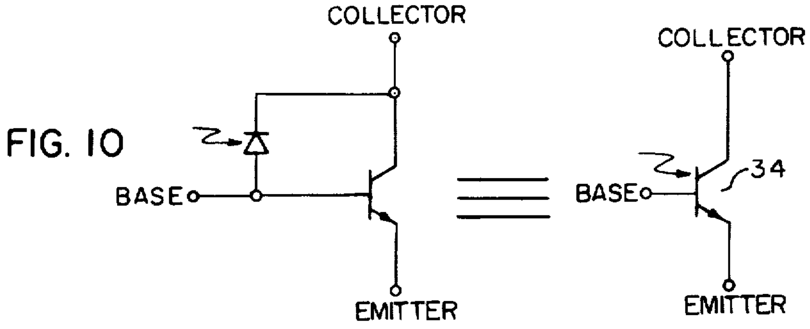
FIG. 10 is a schematic circuitry diagram of a photodiode sensor which can be employed in the circuit of FIG. 6*a*.

Although all circuits shown employ a phototransistor as the light sensor, a photo-diode can equally well be used if a circuit similar to the one shown in FIG. 10 is substituted for the photo-transistor in earlier examples. Observing the obvious resemblance of the photodiode equivalent circuit of FIG. 10 to the diode 32 and transistor 34 of FIG. 6*a*, it may be desirable, in some applications, to fabricate the circuits of FIGS. 8 and 9 as a single monolithic silicon integrated circuit or as a hybrid and allow the light to fall upon the entire structure. This would improve the current transfer ratio. In this configuration, the photo-diode would act as both a photo-sensor and a non-linear feedback element simultaneously.

In optimizing the performance of the circuits of FIGS. 6*a* and 8, several practical considerations should be noted. For best performance, the $V_{CC}$ used to supply the photo-transistors in the circuits of FIGS. 6*a* and 8 should be decoupled from the main supply by means of an RC filter. Also, the circuit shown has been designed for long reliable operation under adverse conditions. A worst case analysis could still be met if the input signal were a square wave, $I_{IN}$ were increased by a factor of four, and $R_1$ were reduced by a factor of eight to further improve the response time. Also, the circuit shown in FIGS. 6*a* and 8 are intended for communication with high threshold logic, but a circuit similar to that shown in FIG. 11 can interface with diode transistor logic and transistor-transistor logic circuits.

Accordingly, the simple, self-optimizing, biasing feedback scheme contemplated by this invention for photo-isolated transmission systems improves the response time and reliability of such systems as well as reducing power consumption and noise generation. Thus, this invention enables the advantages associated with photo-isolated data transmission systems to be applied in applications where it was not previously possible to do so.

We claim as our invention:

1. A photo-electric transmission system including:

a light responsive sensor having an electrical current output;

a transistor amplifier having an emitter, base and collector with the base connected to the sensor in a manner to receive a current input from the sensor in response to light impinging on the sensor, the output of the amplifier appearing across the collector-emitter junction; and non-linear negative feedback means electrically coupled between the base and collector of the transistor amplifier for controlling the base current of the transistor amplifier in a manner to prevent the transistor amplifier from being biased past the threshold saturation state independent of the intensity of light impinging on the sensor.

2. The photo-electric transmission system of claim 1 wherein said transistor amplifier is normally biased in its off state and wherein said sensor, in response to the reception of light, biases the transistor amplifier into its current conducting state.

3. The photo-electric transmission system of claim 2 wherein the sensor in response to the reception of light biases said transistor amplifier into saturation.

4. The photo-electric transmission system of claim 1 wherein said light responsive sensor comprises photo-transistor means having an emitter, base and collector with the current output taken at the photo-electric transistor emitter and the feedback means coupling the base of the photo-transistor means with the collector of the transistor amplifier.

5. The photo-electric transmission system of claim 4 wherein said photo-transistor means comprises a transistor having an emitter, base and collector which respectively form the emitter, base and collector of the photo-transistor means and a photo-diode coupled between the base and collector of the transistor.

6. The photo-electric transmission system of claim 4 wherein said feedback means include a diode connected between the collector of the transistor amplifier and the base of the photo-transistor means positioned to pass current from the photo-transistor base to the collector of the transistor amplifier.

7. The photo-electric transmission system of claim 1 including:

a photo-electric light emitter optically coupled to said light responsive sensor; and means for providing an initial relatively high level surge current input to the photo-electric light emitter which decays to a predetermined DC level.

* * * * *